July 3, 1951

F. A. HAYES 2,559,298

AUTOMATIC PILOT WITH FRICTIONAL PRECESSION
AND ELECTRIC FOLLOW-UP CONTROL

Filed July 31, 1946

Witness: Godfrey Pecina

Inventor
Frank A. Hayes
By William P. Stewart
Attorney

Patented July 3, 1951

2,559,298

UNITED STATES PATENT OFFICE 2,559,298

AUTOMATIC PILOT WITH FRICTIONAL PRECESSION AND ELECTRIC FOLLOW-UP CONTROL

Frank A. Hayes, Middletown, N. J., assignor to The Singer Manufacturing Company, Elizabeth, N. J., a corporation of New Jersey Application July 31, 1946, Serial No. 687,475

9 Claims. (Cl. 244—79)

This invention relates to automatic pilots for stabilized control of aircraft and more particularly to those pilots employing maneuverable gyroscopes to hold a given course and which are selectively precessed to change said course.

It is well known that a freely and universally supported gyroscope will precess at right angles to the direction in which a torque is applied, to change the direction of the spin-axis in space. That is to say, the plane of the torque applied is at right angles to the plane of the resulting precession and both planes contain the spin-axis. The precession rate is proportional to the torque, for a constant rotor speed, and will persist as long as the torque is applied or until the precession is checked by some mechanical or electrical limit device.

Heretofore, gyroscopes have been caused to precess by direct application of torques athwart the rotor axis and about the trunnion axes. This has required the mounting of at least one of the torque-applying means on a movable gimbal, which, unfortunately, complicated the construction and balancing of the parts, and, where the means was electric-current operated, required additional current-conducting means between relatively-moving elements, with its attendant difficulties. Further, the maximum precession angle had to be positively limited by stops or cutout relays to prevent tumbling of the gyroscope and consequent loss of control. The solenoid precessing means, shown in the U. S. patent of Edgar P. Turner, No. 2,513,120, June 27, 1950, is of the general type described hereinabove and may be referred to for a more complete description thereof.

It is an object of this invention, therefore, to provide an automatic pilot having a gyroscopic control element with precessional torque-applying means mounted solely on the stationary parts.

A further object of this invention is to provide an automatic pilot employing a maneuverable gyroscope having a precession control which is automatically self-limiting and removes the precessing force in a predetermined limiting angular position of the spin-axis.

A still further object of this invention is to provide a gyroscopic precession control in which the rotor has its maximum speed when the rotor axis is stationary in space, said rotor speed decreasing when precession occurs, to cause increased precession rate.

The objects set forth above are attained by a novel means for selected precession in which stationary frictional forces are applied to predetermined points of a spherical surface of a spinning rotor.

Several unusual and important advantages result from this construction, of which the following may be mentioned:

1. Simplicity of construction resulting from the complete assembly of the torque-applying means on a stationary element.
2. Self-limiting precession control, preventing tumbling of gyro.
3. Increasing rate of precession when changing course.
4. Maximum fixity of the spin-axis when holding course.

Broadly stated, the device according to the invention comprises a motor-driven gyroscope rotor mounted for universal and non-pendulous movement about its center of gravity, said rotor having a convex spherical surface whose center of curvature coincides with said center of gravity, and means for applying forces normally to said spherical surface at one or more of a plurality of predetermined stationary points. Essentially, the precessing system according to the invention employs the reaction torque created by frictional contact with the spinning rotor at selected eccentric points on the spherical surface thereof to cause a desired amount and direction of precession of the spin-axis.

With the above and other objects in view, as will hereinafter appear, the invention comprises the devices, combinations and arrangements of parts hereinafter set forth and illustrated in the accompanying drawings of a preferred embodiment of the invention from which the several features of the invention and the advantages attained thereby will be readily understood by those skilled in the art.

Figure 1:
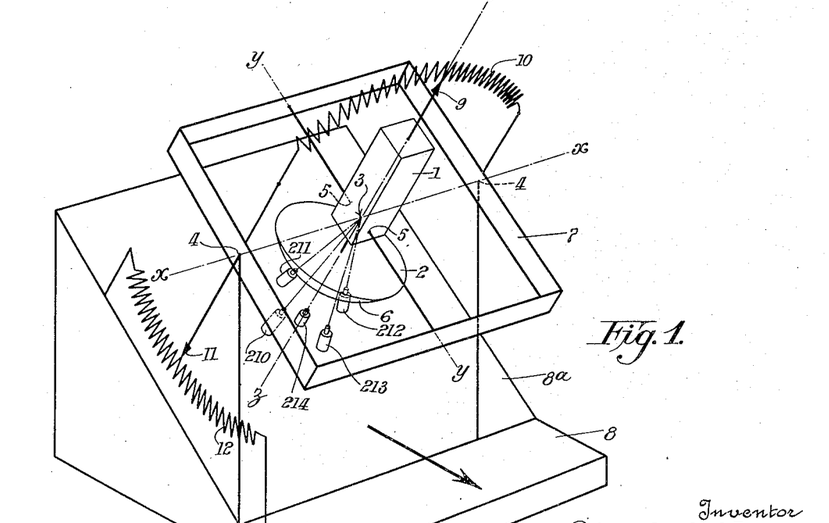
Fig. 1 is a schematic representation of a gyroscopic control instrument embodying the invention.

Referring now to Fig. 1, which is schematic, a gyroscope 1, having a spinning rotor 2, is mounted for free universal movement about its center of gravity at point 3, which point is also the common intersection of axis x—x of trunnions 4—4, axis y—y of trunnions 5—5, and the spin-axis z—z. The rotor 2 carries with it an element 6 providing a convex spherical surface having its center of curvature at point 3. A gimbal ring 7 is carried in trunnions 4—4 mounted on base frame 8 for rotation about axis x—x. The gyroscope 1 is mounted on trunnions 5—5 carried by the gimbal ring 7 for rotation about axis y—y. Secured to the gyroscope 1 and aligned with the spin-axis z—z is a slider 9 which makes contact with potentiometer winding 10 secured to the gimbal ring 7. That is to say, as the gyroscope 1 turns about the axis y—y, the slider 9 traverses the resistance winding 10. A slider 11, secured to the gimbal ring 7, makes contact with potentiometer winding 12, secured to the base frame 8 so that, as gimbal ring 7 turns about the axis x—x, the slider 11 traverses the winding 12.

It will be seen from Fig. 1, wherein the heavy arrow indicates the direction of flight, that the neutral position of the gyro spin-axis relative to the aircraft, and corresponding to a selected course, is in a vertical fore and aft plane with the upper end of the axis tilted forwardly at about 45 degrees with the normal horizon. This inclined neutral position of the gyroscope is essentially the same as that disclosed in U. S. Patent No. 2,513,120, hereinabove referred to, and provides a spin-axis which is normally inclined to all three principal axes of the aircraft and will thus make the single gyroscope sensitive to movements of the aircraft about said principal axes. For example, due to the fixity in space of the spin-axis z—z, deviation in course of the aircraft about its pitch axis produces relative movement between the potentiometer slider 11 and the resistance 12. Similarly, movements of the aircraft about the axes of roll or yaw produce relative movements between the potentiometer slider 9 and the resistance 10. As shall be described presently, these movements are transmitted to an appropriate movable control surface to correct any deviation from course.

The base frame 8 is formed with an inclined portion 8ª which provides a stationary plane normal to the spin-axis in its neutral position and affords a surface upon which to mount solenoids 210, 211, 212, 213 and 214 with their core axes normal to the spherical surface of element 6 and forming a symmetrical stationary pattern about the spin-axis in its neutral position. Two solenoids, 211 and 213, lie in the vertical fore and aft plane through the spin-axis and control precession about the x—x axis for diving or climbing the aircraft. A second pair of solenoids, 210 and 212, lie in a plane containing the spin-axis and disposed at right angles to said fore and aft plane and control the precession about the y—y axis for turning and banking the aircraft to the right or left. These precession control solenoids have their axes arranged radially about the universal support point 3 so that the forces applied by their contact pins 16 are normal to the spherical surface, and movement of said surface does not alter the magnitude of said forces. A single solenoid 214, fixed in alignment with the neutral position of the spin-axis, is employed to precess the gyroscope into a caged neutral position. These solenoids are equipped with operating plungers 15, each carrying at its end a frictional contact pin or finger 16. Normally, each plunger is spring biased to a position just out of contact with the spherical element 6 and, when a solenoid is excited, its plunger 15 is urged axially of the solenoid toward said element so that its contact finger 16 applies a stationary force radial to the spinning spherical surface. It is important that the forces be applied to the spherical surface in a direction to pass through the point of universal support in order that no direct turning moments be applied to the gyro rotor which would cause it to precess improperly. This is directly opposed to the usual practice of purposely applying torques directly athwart the spin-axis to precess the same. This normal force reacts on the spinning rotor to apply indirectly a torque athwart the spin-axis such that the rotor precesses in a plane through the point of contact and containing the spin-axis. If this frictional contact is maintained, the rotor will precess until the spin-axis has moved to align itself with the radius to the spherical surface at the point of contact, at which point precession ceases, even though contact is maintained, because the precessing torque here becomes zero. The direction of precession will always be the same regardless of the direction of spin of the rotor. This is the self-limiting precession feature of this arrangement, and it is evident that the maximum precession angle may be readily established by the selection of the stationary position of the point of contact relative to the neutral position of the spin-axis.

As a matter of fact, it has been found that the exact aligned position described above and defining the angular limit of precession is unstable and the rotor tends to hunt vigorously about this point. This undesirable condition has been removed, according to the invention, by rendering this otherwise unstable position a favored one mechanically, by providing a depression 17 (Fig. 8) in the spherical surface at the intersection thereof with the spin-axis. This depression 17 receives the contact pin 16 in aligned position and, due to the latching action, no further hunting movement occurs. For ordinary maneuvers, the gyro will not be called upon to precess to the limiting positions. However, for extreme maneuvers, the limit thus imposed on the angle of maximum precession prevents tumbling of the gyro.

When two adjacent solenoids are excited simultaneously to contact the spherical surface, as when executing a coordinated maneuver in azimuth and elevation, the rotor will precess in a plane midway between the two points of contact until the spin-axis lies in the common plane containing the two points.

It has been found that, except for the effect of the slowing down of the rotor due to the losses introduced by the frictional contact, the precession rate would be substantially constant, almost up to the limiting angle, where it begins sharply to decrease, reaching zero value at exact alignment. However, actually, the precession rate increase as precession progresses because of the decreasing angular momentum of the rotor as it slows down. This operating feature is advantageous and approaches the ideal for a maneuverable gyro in that the spin-axis has its maximum rigidity in space when flying a fixed course, but, when changing its position by precession, this rigidity is decreased by the rotor slow-down to render precession easier and therefore faster. When the new course has been set, the frictional force is removed, the rotor speed resumes its maximum value, and the spin-axis thus regains its maximum rigidity which minimizes drift due to foreign frictional effects. It will be understood that the actual slowing down of the rotor will be a function of the torque-speed characteristic of the motor itself and said motor may be so chosen that its characteristic produces the desired amount of speed reduction. For example, a synchronous motor would not allow of any decrease in speed.

Thus far, there has been generally described hereinabove a pilot instrument employing a single inclined maneuverable gyroscope having novel precession control means utilizing selective frictional forces on a spinning rotor, and potentiometer means for detecting and assessing deviations of the spin-axis from a predetermined orientation relative to the axes of yaw, roll and pitch of the aircraft. There will now be described a system for utilizing said deviation information to correct the course of the aircraft automatically by selective and proper operation of the movable control surfaces.

This has been accomplished in the present system by the use of a potentiometer follow-up control system preferably employing direct-current. Essentially, two resistance potentiometers are connected to form a Wheatstone bridge circuit, the input for which is connected to a common battery. The output from this circuit is taken from the respective sliders and connects to an operating coil of a polarized relay which selectively closes one of two contacts depending upon the current direction in the coil. These contacts selectively apply battery voltage to a servomotor to cause it to run in a forward or reversed direction and to drive the control surfaces accordingly. Two such potentiometer systems are employed herein, one for operating the elevators, the other for operating the ailerons; although rudder control may be substituted for the aileron control.

Figures 2, 10, 11:
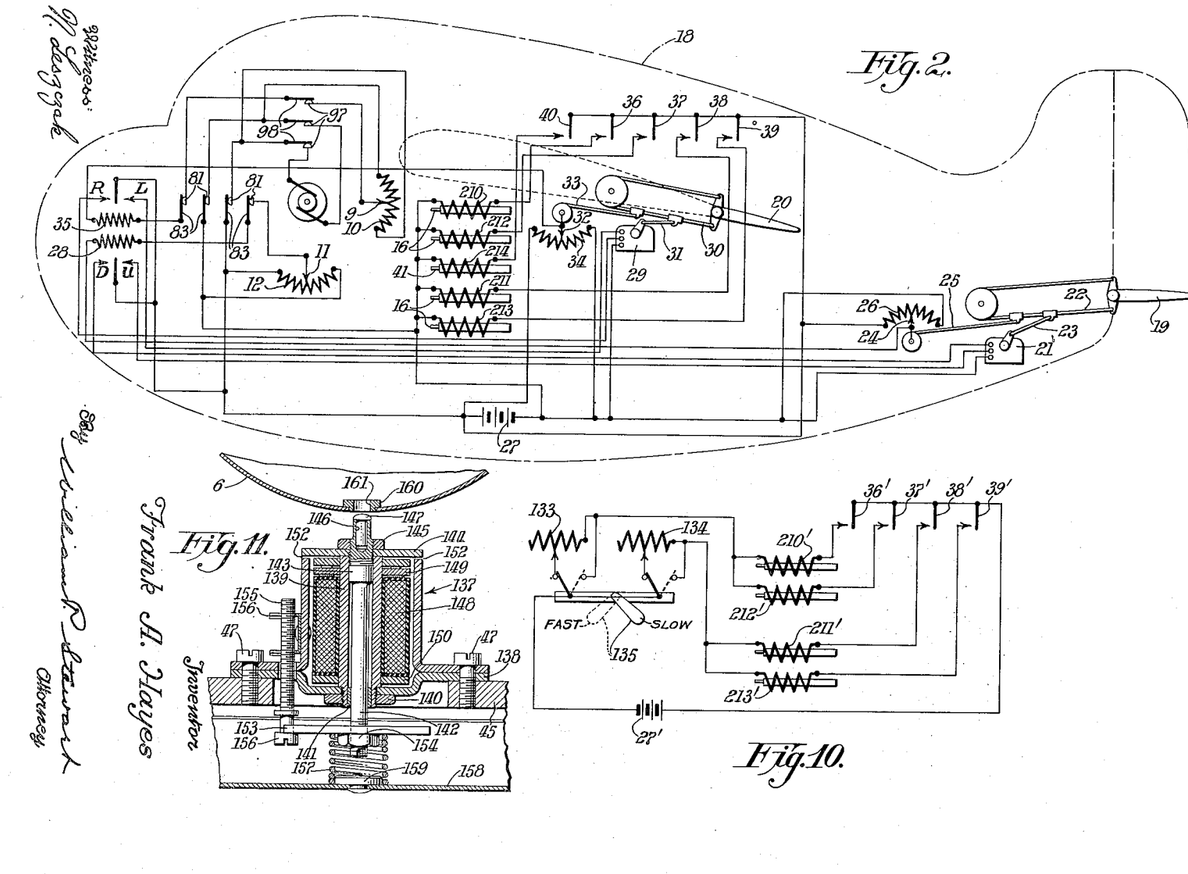
Fig. 2 is a diagrammatic view of a system employing the gyroscopic control instrument in an aircraft.
Fig. 10 is a diagrammatic representation of a modification of part of the circuit of Fig. 2.
Fig. 11 is an enlarged vertical section taken on a central plane through a caging solenoid as modified from the construction of Fig. 8.

Reference to Fig. 2 will show how these elements may be arranged in an aircraft. The aircraft 18 is provided with elevators 19 for controlling course changes about the pitch axis and with ailerons 20 for controlling changes about the axes of yaw and roll. While only one aileron is shown in Fig. 2, it will be understood that the opposite or starboard wing of the aircraft carries a reversely-operated aileron actuated from the same controls. A servomotor 21 is connected to an elevator control cable 22 through the usual crank and link mechanism 23. A potentiometer slider 24 is mechanically connected for rotation by a cable 25 to the elevator control cable 22 and is spring biased to maintain the cable under tension. A resistance winding 26, traversed by the slider 24, is mounted on the aircraft frame and is electrically connected to a battery 27. Potentiometer winding 12 at the gyroscope is mounted on the base frame 8 and its slider 11 is mounted on the gimbal ring for rotation therewith. The winding 12 is also connected across the battery 27. Slider 11 and slider 24 are connected electrically in series with coil 28 of a polarized relay having contacts D and U which function as an automatic single-pole double-throw switch. These relay contacts selectively connect the servomotor 21 with the battery 27 for forward and reverse operation respectively.

To explain the operation of this system, assume that the course of flight is accidentally altered by a gust of wind, for example, causing the aircraft to dive off course. Due to fixity of the spin-axis, the slider 11 will remain fixed in space while the winding fixed to the aircraft is rotated relative thereto. This unbalances the bridge circuit formed by the windings 12 and 26 and a current will flow in coil 28 of the relay which will cause contacts U to close. This closure will cause servomotor 21 to be connected to battery 27 so that it will run and drive the elevators 19 in a direction to cause the aircraft to climb to correct the dive. At the same time, the slider 24, connected mechanically to the servomotor 21, will be driven towards a position, in contact with winding 26, which will balance the bridge circuit. However, the aircraft responds, due to the elevator action, and the gyro spin-axis is restored to its neutral orientation bringing slider 11 back to its mid-position. Through the follow-up servo action, the servo slider 24 is also returned to mid-position and the elevator 19 is driven to its horizontal position and normal flight on course is resumed.

It will be apparent that any relative change in the position of the slider 11 and the winding 12 will cause the operation just described. Thus, for example, when it is desired to change the vertical course at the will of the operator, the proper solenoid frictional finger 16 is operated to cause precession of the gyroscope as explained above. This will unbalance the potentiometer bridge circuit because the slider 11 rotates in pitch with the spin-axis and moves relative to the winding 12. Due to the servo-action above described, the elevators 19 will be operated to bring the aircraft around the pitch axis to a new course depending on how far the spin-axis is precessed in space. In other words, the aircraft tends to fly a course in space set by the spin-axis position.

A second servomotor 29 is connected to an aileron control cable 30 through the usual crank and link mechanism 31. A potentiometer slider 32 is connected by cable 33 under spring tension to the aileron control cable 30. A potentiometer winding 34 is connected to the battery 27, and the slider 32 traverses this winding. At the gyro, potentiometer winding 10 is secured to the gimbal ring 7 and its traversing slider 9 is fixed relative to the spin-axis z—z. The winding 10 is also connected across the battery 27. The sliders 9 and 32 are electrically connected in series with an operating coil 35 of a polarized relay having contacts R and L which function as a single-pole double-throw switch. These relay contacts, when operated, selectively connect the servomotor 29 to the battery 27 for forward and reverse operation thereof respectively. Thus, if the aircraft deviates from its course about the yaw axis, for example, the winding 10 moves relatively to the slider 9 to unbalance the bridge circuit. A current is caused to flow in the coil 35 causing the proper contact (R or L) to close, thus operating the servomotor 29 to drive the ailerons 20 to correct the deviation from course. As in the case of elevator control, course changes in azimuth may be made by selecting the proper solenoid to cause precession of the spin-axis about axis $y$—$y$.

Simple switches, 36, 37, 38 and 39, may be operated to select and actuate the proper solenoids to pick up the corresponding friction pins for causing the desired precession for any maneuver. When on the new course selected, the switches are opened and the aircraft will fly the course set and will automatically sense and correct any departure from said course through the gyro-servo follow-up system described. A caging switch 40 may be used to pick up the caging pin 41 to restore the spin-axis to its exact neutral position whenever desired. Contacts 81, 83, 97 and 98 represent electrical connections between relatively rotating elements and will be described more in detail presently.

While the servo system described herein is operated by direct-current power, it is to be understood that this invention is not to be construed as so limited, but includes within its scope alternating-current operated servo systems employing amplifiers for increased sensitivity which are well known in the art.

Figure 3:
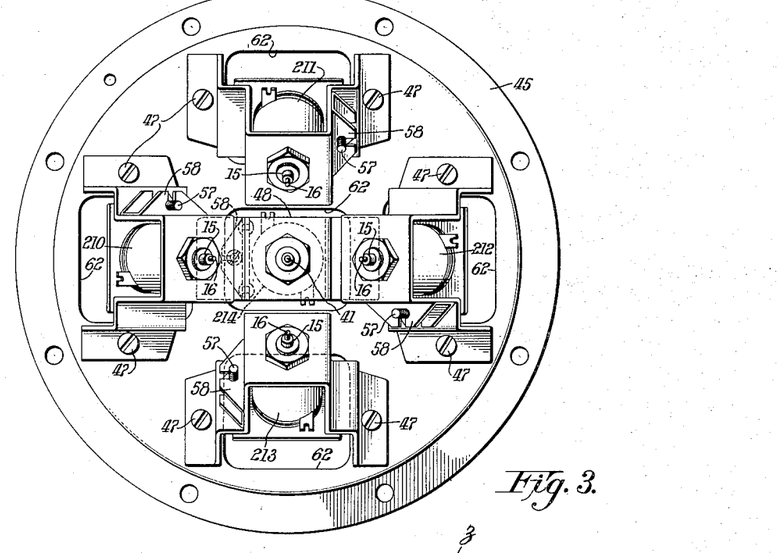
Fig. 3 is a plan view of the solenoid assembly of the gyroscopic control instrument of Fig. 1.

The specific constructional details of the pilot device according to this invention are best seen by reference to Figs. 3 through 9 inclusive, wherein the stationary base frame 8 supports the entire mechanism. The inclined portion 8$^a$ is formed with an aperture 44 within which is fitted a circular support plate 45 secured to said inclined portion by means of screws 46. Solenoids 210, 211, 212, 213 and 214 are secured to plate 45 by means of screws 47 as best seen in Fig. 3.

Figure 8:
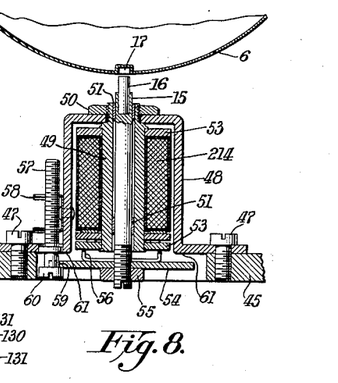
Fig. 8 is an enlarged vertical section taken on a central plane through a solenoid of the instrument of Fig. 1.

Fig. 8 shows a section through a typical solenoid which comprises a mounting bracket 48 to which is attached a hollow armature core 49 by means of a nut 50. Bushings 51 fitted within the core 49 serve as bearings for the reciprocatable plunger 15. A winding 52 surrounds the core 49 and is held in place by insulated end washers 53 which are retained on the core 49 by spun-over portions thereof. One end of the plunger 15 carries the friction pin 16, preferably made of fibre, and the opposite end carries a magnetic stop plate 54 retained on the plunger by a lock nut 55. A U-shaped spring 56 secured to said stop plate bears against one of the end washers 53 and serves to bias the plunger in downward position as viewed in Fig. 8. To retain the plunger in the core, an adjusting screw 57, threaded into a bracket 58 secured to mounting bracket 48, is passed through a slot 59 in one edge of the plate 54 so that said plate bears against the inner shoulder formed by the head 60. It will now be seen that the air gap formed between the stop plate 54 and flat portions 61 of the mounting bracket may be preadjusted by movement of screw 57. This will control the pressure exerted by the friction pin 16 against the spherical surface of element 6 and will primarily determine the precession rate. The clearance between the end of pin 16 and the spherical element 6, which should be a minimum, may be controlled by screwing the plunger 15 in or out of the nut 55. Apertures 62 formed in the support plate 45 beneath each solenoid permit the foregoing adjustments to be readily and conveniently made from the bottom of the instrument, as seen best in Fig. 4. A cover 63 with gasket 64 are secured to the bottom of plate 45 by means of screws 46 and prevent entry of foreign matter into the interior of the instrument case. It will be evident that the entire solenoid assembly may be made externally of the instrument on the single plate 45 (Fig. 3), which may then be installed as a unit, requiring only simple stationary electrical connections to render it operative.

The gimbal ring 7 is mounted for rotation about the axis $x$—$x$ by means of the following construction.

The base frame 8 is cast with an upstanding wall 65 formed with a boss 66 into which is threaded a pivot stud 67 formed at its interior end with a reduced portion 68. The reduced portion 68 fits within the inner race-ring of a ball bearing 69 carried within a recess 70 in the gimbal ring 7. A lock nut 71 secures the pivot stud 67 relative to the wall 65. An upstanding pedestal 72, cast as part of the base frame 8, is formed at its upper end with a saddle portion 73, forming with a removable cap 74 a bearing aperture 75, in which is secured a ball bearing 76. A snap ring 77 is secured within said aperture 75 to form a thrust collar for the bearing. The gimbal ring is formed with a hollow stub shaft 78 having a reduced portion which fits within the inner race-ring of the ball-bearing 76. Pinned to the end of said stub shaft 78 is a contact-holder 79 preferably made of molded insulating material. Secured to said contact-holder 79 by means of insulated pin 80, are contacts 81 placed back to back on either side of insulated spacers 82. The contacts 81 have contact points aligned on the axis of rotation $x$—$x$. Lead wires (not shown) traverse the hollow shaft 78 and are soldered to the contacts 81.

Stationary contact fingers 83 are mounted in spaced relation between insulated blocks 84 which are secured as a unitary assembly to the cap 74 and serve to conduct the electrical currents picked off the moving contacts 81 to the proper stationary apparatus.

A motor, preferably of the permanent magnet type having constant speed characteristics, is mounted in housing 85 and is provided with an external shaft 86 to which is secured, by means of nuts 87, the rotor 2 having suitable rotational inertia. Secured to said rotor 2 is a segmentally spherical cup 6 which provides a convex spherical surface having its center of curvature at point 3 which is also the common intersection of the $x$—$x$, $y$—$y$, and $z$—$z$ axes. The motor housing is mounted on the gimbal ring 7 for turning movement about the $y$—$y$ axis in accordance with the following construction.

The motor housing 85 is formed with a cup portion 88 in which is seated the outer race-ring of a ball bearing 89. The gimbal ring 7 carries a boss 90 into which is threaded a pivot stud 91 which fits within the inner race-ring of the ball-bearing 89. A lock nut 92 secures the pivot stud 91 relative to the gimbal ring 7. On the opposite side, the motor housing 85 is formed with a hollow stub shaft 93 with a reduced end portion which fits within the inner race-ring of a ball-bearing 94. The outer race-ring of the ball-bearing 94 is seated within an aperture in the gimbal ring 7 and is provided with a snap ring 95 against which said outer race-ring bears to take the end thrust. Secured to the end of the stub shaft 93 is a contact holder 96, preferably of molded insulating material. Movable contacts 97 are secured to the contact holder 96 in the same manner as previously described with relation to contacts 81 and contact holder 79. Stationary contact fingers 98 are mounted in spaced relation between insulating blocks 99, secured as a unitary assembly to the gimbal ring 7, by means of screws 100. Leads (not shown) traverse the hollow stub shaft 93 and are soldered to contacts 97 for conducting currents to the proper elements on the motor housing.

As has been mentioned hereinbefore, it is important that the gyroscope 1 including the spinning rotor 2 and motor housing 85 be mounted so that it is non-pendulous. That is to say, the composite center of gravity of these parts should be coincident with point 3. To accomplish this, cursor weights 101, 102 and 103 are adjustably mounted on threaded studs fixed to said motor housing 85. The arrangement is such that any unbalance about the point 3 may be compensated by shifting the proper weights on the studs. Two weights are mounted on each stud with a spring lock washer 104 between them for preventing accidental shifting which might otherwise occur due to the vibration associated with aircraft.

Since the gimbal ring 7 is constrained to rotate in pitch with the gyroscope 1 about the $x$—$x$ axis, said gimbal ring must be balanced independently about this axis. For this purpose, a pair of cursor weights 105 are adjustably mounted on a threaded stud fixed to the gimbal ring 7.

The gimbal ring 7 is formed with two upstanding arms 106 and 107 to the free ends of which are secured, by means of screws 108, a bowed insulated core 109 on which is distributed the potentiometer winding 10.

Secured to an upstanding wall 110 of the base frame 8 by means of shouldered screws 111 is a bowed insulated core 112 on which is placed the potentiometer winding 12.

A contact bracket 113 is secured to the motor housing 85 by means of screws 114, but is insulated therefrom by means of bushings 115 and insulation pad 125. The outer end of the bracket 113 is formed with two spaced limbs between which is journaled the contact 9, urged into contact with the winding 10 by means of a light tension spring 116. To take up play between the contact and its mounting bracket, the pressure exerted by plate 117 against the contact pivot ends may be adjusted by means of screw 118. A soldering lug 119 is employed to facilitate electrical connection to said contact 9.

The gimbal ring 7 is formed with a depending arm 120 to which is secured, by means of screws 121, a contact assembly very similar to that just described and comprising, bracket 122, contact 11, tension spring 123, adjusting plate 124 and an adjusting screw (not shown). A soldering lug 126 provides for readily establishing an electrical connection to the contact 11.

As an additional safeguard, mechanical limit fingers 137 and 138 are secured to plate 45 by means of solenoid screws 47 to prevent extreme excursions of the gimbal ring 7 from interfering with and damaging the solenoids.

Figure 7:
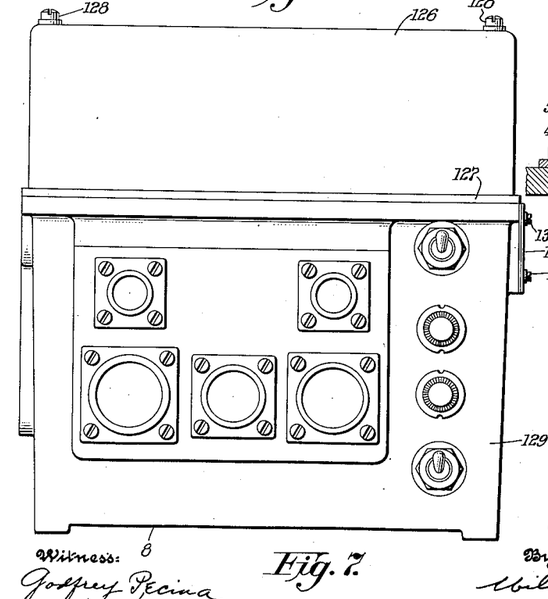
Fig. 7 is an exterior front elevation view of the instrument of Fig. 1.

The base frame 8 is provided with upstanding walls which form a box-like container or case for the instrument as shown. A cover 126, preferably of transparent plastic material, seated against a gasket 127, is held in place and secured to the base frame 8 by means of screws 128. One upstanding wall portion 129 conveniently serves as a panel board on which are mounted connectors, switches and fuses as shown in Fig. 7, the details of which are not essential to this invention.

Figure 9:
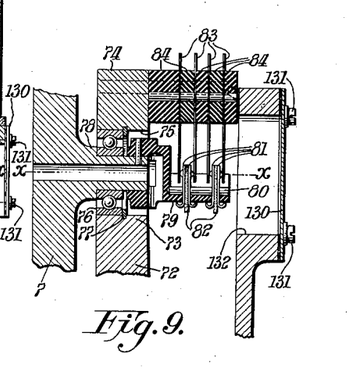
Fig. 9 is an enlarged vertical section taken on line 9—9 of Fig. 5.

A removable plate 130, secured by means of screws 131, covers an inspection opening 132 through which access to the contacts 81 and 82 may be gained, as most clearly seen in Fig. 9.

The system described above will have a precession rate fixed and determined by the forces exerted on the spherical surface of element 6 by the contact fingers 16, which forces may be adjusted by means of screws 57 as explained. It is desirable, however, to have available a slow and a fast precession rate for this system and, to this end, a modified circuit may be provided as shown in Fig. 10. This makes available alternative means of supplying the solenoids with current of full value or of a value limited by resistors 133 and 134 and comprises switches 36', 37', 38' and 39' controlling current flow to solenoids 210', 212', 211' and 213' respectively. A double-pole double-throw switch 135 may be operated to connect the solenoid pairs 210', 212' and 211', 213' directly to one side of the battery 27' or through a predetermined portion of resistors 133 and 134 respectively, thence to the battery 27'. It will be understood that the reduced current flow resulting from the inclusion of portions of resistors 133 and 134 causes reduced forces to be exerted by the solenoid contact fingers 16 on the spherical surface of element 6, resulting in a reduced precession rate. Resistors 133 and 134 are conveniently mounted within the instrument case as shown in Fig. 5.

Figure 4:
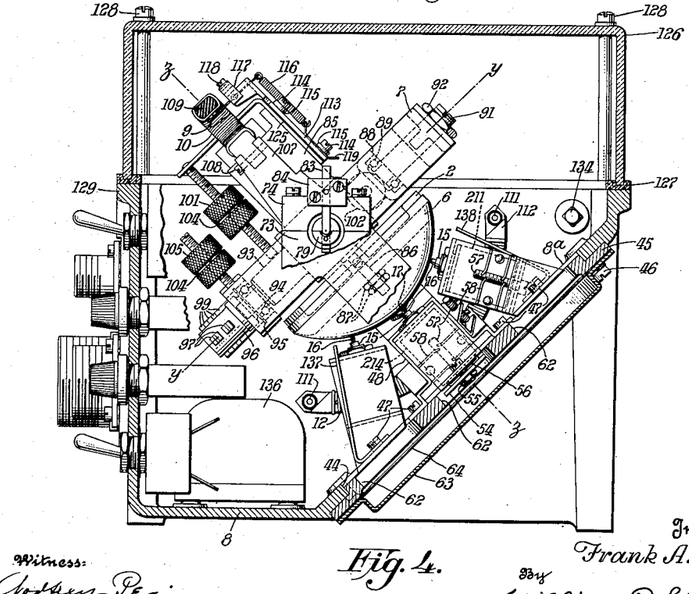
Fig. 4 is a side elevation view, partly in section, of the instrument of Fig. 1.
Figure 5:
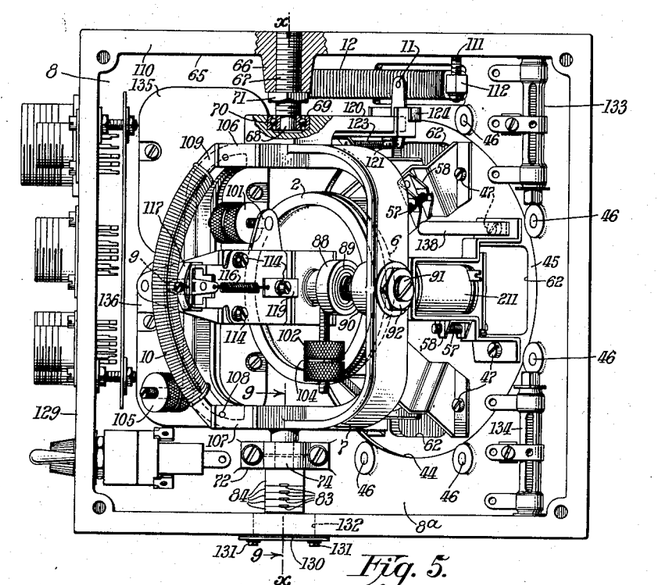
Fig. 5 is a top plan view, partly in section, of the instrument of Fig. 1.
Figure 6:
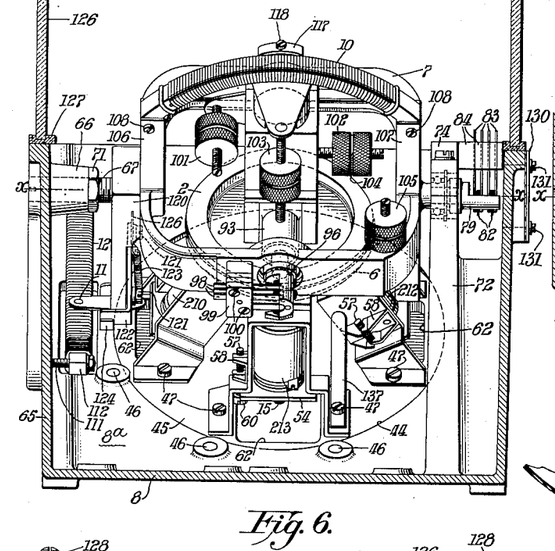
Fig. 6 is a front elevation view, partly in section, of the instrument of Fig. 1.

It is also convenient to mount polarized relays 135 and 136, containing the operating coils 28 and 35 respectively, on the base frame 8, as seen best in Figs. 4 and 5.

For certain applications, it has been found desirable to have the gyro become caged automatically in the event of a failure of the power supply. Accordingly, a modified construction has been developed for the caging solenoid and is shown in Fig. 11. Broadly, this modified construction comprises a solenoid having its plunger spring-biased to engage the spherical surface except when the solenoid is excited to overcome the spring force. Thus, the gyro remains caged under all conditions until the control switch is closed to excite the caging solenoid. Referring now to Fig. 11, a caging solenoid 137 is provided with a mounting bracket 138 secured to plate 45 by means of screws 47. A hollow armature core 139 is secured to said bracket by means of a nut 140 and carries within one end thereof a bearing bushing 141. A plunger 142 is mounted within the hollow armature core 139 for reciprocation within the bushing 141, and is formed with an enlarged portion 143 which provides for bearing against the inner wall of said armature 139. This enlarged portion 143 is also threaded so that plate 144 and lock nut 145 may be secured thereto. At the extremity of said plunger is an axial bore 146 in which is fitted a pin 147, preferably of fibre, and formed with a spherical head. A coil winding 148 is positioned on said armature 139 and secured between insulation washers 149 and 150 in the usual manner. Stationary upright arms 151, secured against the mounting bracket 138, complete the magnetic circuit threading the coil 148 and forms, with the plate 144, air gaps 152.

A stop plate 153 is threaded onto the inner end of the plunger 142 and is secured thereon by means of a lock nut 154. An adjusting screw 155 threaded into a bracket 156 is passed through a slot in one edge of the plate 153 so that said plate bears against the inner shoulder formed by the head 156.

The solenoid 137 is shown in Fig. 11 in its excited condition, with the air gap 152 a minimum and with a spring 157 compressed against a cover 158. A centering button 159 secured to the cover maintains the spring 157 in proper alignment with the plunger 142. The spherical surface element 6, has suitably secured thereto a bearing bushing 160, preferably of pressed metal, and forming a bore 161 into which the end of plunger 142 may be urged by the spring 157 when the solenoid 137 is unexcited. A close fit between the end of the plunger 142 and the bore 161 has been found essential in preventing oscillation due to lost motion. The engagement of these parts becomes, accordingly, a true bearing rather than a detent.

Having thus set forth the nature of the invention, what I claim herein is:

1. In an automatic pilot, a maneuverable gyroscope comprising, a spinning rotor mounted for universal movement about a point and having a spinning convex surface spherical about said point, said rotor having a neutral position for its spin-axis, frictional contact fingers arranged symmetrically about said spin-axis in its neutral position and radially about said point, means selectively to move said contact fingers radially toward said convex surface to engage same normally, whereby said rotor is caused to precess to move said spin-axis out of its neutral position.

2. In a maneuverable gyroscope, a spinning rotor having a spin-axis, means for mounting said rotor for universal movement about a point, said rotor providing a surface spherical about said point and having a receiving bore located at the intersection of said surface and said spin-axis, said spin-axis having a neutral position, frictional contact fingers arranged in space radially about said point, means for urging a selected one of said fingers radially toward said spherical surface to engage same normally, whereby said rotor is caused to precess out of said neutral position into a limiting position in which said contact finger engages said receiving bore.

3. A system for controlling the course of an aircraft comprising an aircraft having movable control surfaces, a spinning rotor mounted for universal movement relative to said aircraft, a predetermined neutral position for the axis of said rotor relative to said aircraft, means for maintaining said neutral position including sensing means for detecting deviations from said neutral position and control means for correcting said deviations by operation of said control surfaces, and means independent of said control means for selectively shifting the axis of said rotor out of said neutral position, said last means including a plurality of frictional contact pins for applying forces to the surface of said spinning rotor at different selected stationary points.

4. A system for controlling the course of an aircraft in space, comprising, an aircraft having movable control surfaces, a spinning rotor mounted for universal movement relative to said aircraft, a predetermined neutral position for the axis of said rotor relative to said aircraft, means for maintaining said neutral position including sensing means for detecting deviations from said neutral position due to departure of said aircraft from a fixed course, and control means operative responsively to said sensing means to move the control surfaces to correct said departure from course, and frictional contact pins for selectively precessing the axis of said rotor out of said neutral position by the application of said pins in frictional contact with the surface of said spinning rotor at selected stationary points for selectively changing the course of said aircraft.

5. A system for controlling the course of aircraft in space, comprising, an aircraft having movable control surfaces, a spinning rotor mounted for universal movement relative to said aircraft, a predetermined position for the axis of said spinning rotor relative to said aircraft, means for maintaining said predetermined rotor-axis position relative to said aircraft including means responsive to changes in said position for moving said control surfaces to correct said change, and means for selectively shifting said rotor-axis in space out of said neutral position for altering the course of said aircraft in space, said last-mentioned means including solenoid-actuated frictional contact pins for applying forces normal to the surface of said rotor at preselected stationary points with respect to said aircraft, which forces react on the spinning rotor to apply torques causing precession thereof in any desired direction.

6. In a gyroscopic apparatus for use on an aircraft having movable controlling planes for directing said aircraft about its three principal axes, a gyroscope rotor adapted to be universally mounted in said aircraft, the spin-axis thereof being normally disposed at a predetermined inclination to all three principal axes of the aircraft, means responsive to relative movements between said aircraft and said gyroscope rotor for actuating said controlling planes to maintain said predetermined inclination, and manually-controlled precessing means for shifting the spin-axis in space, said last-named means including solenoid-actuated frictional contact members, for selectively applying to the surface of said gyroscope rotor stationary forces eccentrically of said spin-axis.

7. In a system for directing the course of an aircraft in space, an aircraft having movable control planes, a rotor spinning on an axis, means for mounting said axis for universal movement about a point on said aircraft, said axis having a predetermined orientation relative to said aircraft, means for maintaining said orientation including means for operating said control planes to move said aircraft relative to said axis to correct deviations from said predetermined orientation and independent means for moving said axis relative to said aircraft, said latter-named means including solenoid-actuated friction contact pins for applying to the surface of said rotor selective stationary forces whereby to change the course of said aircraft responsive to operation of said orientation-maintaining means.

8. An automatic pilot system for directing the course of an aircraft in space, comprising, a spinning gyroscope rotor, a journaling support for said rotor, mounted for universal movement about the composite center of gravity of said rotor and support, said rotor having a surface spherical about said center of gravity, a predetermined neutral position for said support and for the rotor spin-axis relative to said aircraft, means for applying forces normal to said spinning spherical surface at predetermined stationary points symmetrical about the neutral position of said axis and manual means for selecting one or more of said force-applying means, whereby to cause movement of said rotor support in any desired direction.

9. A gyroscopic controller comprising, gyroscopic means mounted for free universal movement relative to a stationary support, a spherical surface operatively connected with said gyroscopic means, contact elements operatively connected with said stationary support and arranged in a predetermined pattern, and manually controlled means for causing selective mechanical engagement between one or more of said contact elements and said spherical surface.

FRANK A. HAYES.

REFERENCES CITED

The following references are of record in the file of this patent:

UNITED STATES PATENTS

| Number | Name | Date |
|---|---|---|
| 1,825,345 | Fieux | Sept. 29, 1931 |
| 1,825,994 | Cooke | Oct. 6, 1931 |
| 1,826,013 | Meredith | Oct. 6, 1931 |
| 2,005,530 | Boykow | June 18, 1935 |
| 2,199,256 | DeFlorez | Apr. 30, 1940 |
| 2,417,689 | Johnson | Mar. 18, 1947 |
| 2,422,267 | Summers | June 17, 1947 |

FOREIGN PATENTS

| Number | Country | Date |
|---|---|---|
| 365,189 | Great Britain | Dec. 19, 1931 |
| 547,208 | Great Britain | Aug. 18, 1942 |